United States Patent [19]

Ahmed et al.

[11] Patent Number: 5,250,642
[45] Date of Patent: Oct. 5, 1993

[54] COPOLYMERS OF AMPHOLYTIC ION PAIRS CONTAINING VINYLIC TERTIARY AMINE AND OLEFINIC COMONOMERS

[75] Inventors: Iqbal Ahmed; Henry L. Hsieh, both of Bartlesville, Okla.

[73] Assignee: Phillips Petroleum Company, Bartlesville, Okla.

[21] Appl. No.: 886,215

[22] Filed: May 20, 1992

[51] Int. Cl.⁵ .................. C08F 220/06; C08F 230/02; C08F 228/02
[52] U.S. Cl. .................................. 526/240; 526/259; 526/264; 526/277; 526/287
[58] Field of Search ............... 526/240, 259, 264, 277, 526/278, 287

[56] References Cited

U.S. PATENT DOCUMENTS

| | | | |
|---|---|---|---|
| 4,454,114 | 6/1984 | Strasilla | 526/216 |
| 5,075,399 | 12/1991 | Ahmed et al. | 526/287 |
| 5,098,970 | 3/1992 | Hsieh | 526/287 |
| 5,106,929 | 4/1992 | Ahmed | 526/240 |

OTHER PUBLICATIONS

Encyclopedia of Polymer Science and Engineering, vol. 11, pp. 514,530 (1988).

*Primary Examiner*—Christopher Henderson
*Attorney, Agent, or Firm*—Lucas K. Shay

[57] ABSTRACT

A composition of a superabsorbent polymer and a process for using the polymer to absorb an aqueous electrolyte solution are disclosed. The composition comprises repeating units derived from: (a) an ampholytic ion pair prepared from a polymerizable vinylic tertiary amine-containing monomer and an acid having an ethylenic moiety; (b) at least one comonomer selected from the group consisting of acrylamide, methacrylamide, acrylonitrile, acrylic acid, ethacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacrylamidopropyldimethylamine, styrene sulfonic acid, alkali salts of styrene sulfonic acid, and N-vinyl-2-pyrrolidone; and optionally, (c) at least one crosslinking agent which has at least two polymerizable olefinic functionalities wherein the olefinic functionalities are suitable for crosslinking.

20 Claims, No Drawings

COPOLYMERS OF AMPHOLYTIC ION PAIRS CONTAINING VINYLIC TERTIARY AMINE AND OLEFINIC COMONOMERS

FIELD OF THE INVENTION

The present invention relates to polymers capable of absorbing aqueous electrolyte solutions.

BACKGROUND OF THE INVENTION

Polymers for absorbing aqueous electrolyte solutions are used in numerous commercial and industrial applications. For example, polymers are used to improve the water absorbency of paper towels and disposable diapers.

Though known water absorbing polymers are highly absorbent to deionized water, they are dramatically less absorbent to aqueous electrolyte solutions such as salt water, brine, and urine. For example, hydrolyzed crosslinked polyacrylamide absorbs 1,024 grams of deionized water per gram of polymer, but only 25 grams of synthetic urine per gram of polymer. Crosslinked polyacrylate absorbs 423 grams of deionized water per gram of polymer, but only 10 grams of synthetic urine per gram of polymer. Hydrolyzed crosslinked polyacrylonitrile absorbs 352 grams of deionized water per gram of polymer, but only 25 grams of synthetic urine per gram of polymer. Analogous starch grafted copolymers generally have very poor absorbency to synthetic urine.

It would be a valuable contribution to the art to develop polymers with high absorbency to aqueous electrolyte solutions. The market for these types of copolymers is large and the uses are numerous. Therefore, seemingly small improvements in the absorbency translate into large savings in the quantity of polymer required to absorb these liquids and large savings to consumers.

SUMMARY OF THE INVENTION

Thus, it is an object of the present invention to provide polymers which are high absorbent to aqueous electrolyte solutions. It is also an object of the present invention to provide a process for preparing the polymers having high absorbency to aqueous electrolyte solutions. A further object of the present invention is to provide a method of using the polymers of the present invention for absorbing an aqueous electrolyte solution.

Further objects, features, and advantages of the present invention will be readily apparent to those skilled in the art upon reading the description of the invention which follows.

According to a first embodiment of the present invention, a polymer having a high absorbency to aqueous electrolyte solutions is provided which comprises repeating units derived from: (a) an ampholytic ion pair which is prepared from a polymerizable vinylic tertiary amine-containing monomer and an acid having an ethylenic moiety wherein the ompholytic ion pair has one polymerizable vinyl group which is at the terminal end of the ion pair and said acid is selected from the group consisting of carboxylic acid and phosphoric acid; (b) at least one comonomer selected from the group consisting of acrylamide, methacrylamide, acrylonitrile, acrylic acid, ethacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, 3-methacrylamidopropyltrimethylamine, 3-methacrylamidopropyldimethylamine, 2-methacryloyloxyethyldiethylamine, styrene sulfonic acid, alkali salts of styrene sulfonic acid, and N-vinyl-2-pyrrolidone; and optionally, (c) at least one crosslinking agent which as at least two polymerizable olefinic functionalities wherein the olefinic functionalities are suitable for crosslinking.

According to a second embodiment of the present invention, process for absorbing an aqueous electrolyte solution comprises contacting a superabsorbent polymer which is prepared by copolymerization of: (a) an ampholytic ion pair which is prepared from a polymerizable vinylic tertiary amine-containing monomer and an acid having an ethylenic moiety wherein said acid is selected from the group consisting of carboxylic acid and phosphoric acid; (b) at least one comonomer selected from the group consisting of acrylamide, methacrylamide, acrylonitrile, acrylic acid, ethacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacrylamidopropyldimethylamine, styrene sulfonic acid, alkali salts of styrene sulfonic acid, and N-vinyl-2-pyrrolidone; and optionally, (c) at least one crosslinking agent which has at least two polymerizable olefinic functionalities wherein the olefinic functionalities are suitable for crosslinking; with an aqueous electrolyte solution.

DETAILED DESCRIPTION OF THE INVENTION

The present invention provides a polymer that is highly absorbent to aqueous electrolyte solutions. Typical aqueous electrolyte solutions include, but are not limited to, the group consisting of tap water, salt water, brine and urine. The term "polymer" used herein to describe the invention generically refers to a polymer having two or more different monomers, i.e. copolymers, terpolymers, tetrapolymers, etc., and includes those prepared by copolymerization of an effective amount of each of the following monomers to produce a polymer that has the above-described properties: (a) an ampholytic ion pair prepared from a polymerizable vinylic tertiary amine-containing monomer and an acid having an ethylenic moiety; (b) at least one comonomer selected from the group consisting of acrylamide, methacrylamide, acrylonitrile, acrylic acid, ethacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacrylamidopropyldimethylamine, styrene sulfonic acid, alkali salts of styrene sulfonic acid, and N-vinyl-2-pyrrolidone; and optionally, (c) at least one crosslinking agent which has at least two polymerizable olefinic functionalities wherein the olefinic functionalities are suitable for crosslinking.

Unless otherwise indicated, the term "alkali salts" is generically used in this application to mean salts containing ammonium cation and alkali metal cations such as lithium, sodium and potassium.

The presently preferred polymerizable vinylic tertiary amine-containing monomer is selected from the group consisting of N-vinylimidazole, 1-methyl-2-vinylimidazole, 2-vinylimidazole, 4(5)-vinylimidazole, 2-vinylpyridine, 4-vinylpyridine, 2-dimethylaminoethyl methacrylate, 2-diethylaminoethyl methacrylate, 3-methacrylamidopropyldimethylammonium, 3-methacrylamidobutyldimethylammonium, diallyldimethylammonium, 2-vinylquinoline, and mixtures thereof. The presently most preferred polymerizable vinylic tertiary amine-containing monomers are N-vinylimidazole, 2-vinylpyridine, 4-vinylpyridine, 2-dimethylaminoethyl methacrylate, 2-diethylaminoethyl methacrylate, 3-methacrylamidopropyldimethylammonium, and mixtures thereof.

The acid moiety of the ampholytic ion pair must have a polymerizable ethylenic linkage and is selected from the group consisting of vinylic carboxylic acids, vinylic phosphoric acids, alkali salts thereof and mixtures thereof. The presently preferred vinylic carboxylic acids and alkali salts thereof include, but are not limited to, acrylic acid, methacrylic acid, maleic acid, itaconic acid, N-vinylglycine, vinylacetic acid, 4-vinylbenozic acid, crotonic acid, styrene acetic acid, dimethylvinyl acetic acid, 5-heptenic acid (4-vinylvaleric acid), 2-hexenoic acid, 3-hexenoic acid, 3-vinyl-4-piperidine acetic acid, 4-vinyl-1-cyclohexene-1,4-dicarboxylic acid, 10-undecenoic acid, cinnamic acid and 2-acetamidoacrylic acid, and mixtures thereof. The presently most preferred vinylic carboxylic acids and alkali salts thereof are acrylic acid and methacrylic acid, and mixtures thereof.

Examples of the presently preferred vinylic phosphoric acids and alkali salts thereof are vinyl phosphoric acid and allyl phosphoric acid.

The ampholytic ion pairs can be prepared by the following procedures. The ampholytic ion-pair monomer may be prepared by titrating an aqueous solution of an acid monomer to pH7 with a polymerizable tertiary amine containing monomer at a temperature of about 0°-15° C. The resulting aqueous solution containing the ampholytic ion pair monomer may be purified by contacting the aqueous solution one or more times with small quantities of activated charcoal. The concentration of the ampholytic ion-pair in the aqueous solution may be determined by evaporatively drying a known amount of the aqueous solution and weighing the residue.

Alternatively, the ampholytic ion-pair monomer may be prepared by reacting the acid monomer with tertiary amine containing monomer in an anhydrous organic solvent, such as tetrahydrofuran and ethyl acetate. In this case the ampholytic ion-pair monomer is obtained as precipitate. The solid monomer may be purified by recrystallization from chloroform or other organic solvent. Because the solid ampholytic ion pair monomers are extremely hygroscopic and tend to polymerize spontaneously, they should be handled carefully.

The term "monomer" is used herein to generically, unless otherwise indicated, mean monomers, comonomers, termonomers, tetramonomers, etc. The term "comonomer" is used generically, unless otherwise indicated, to mean monomers, comonomers, termonomers, tetramonomers, etc. for polymers wherein there are at least two different monomers.

The olefinic comonomers can include, but are not limited to the group consisting of acrylamide, methacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, 2-methacryloyloxyethyldiethylamine, 3-methacrylamidopropyldimethylamine, styrene sulfonic acid, alkali salts of styrene sulfonic acid, N-vinyl-2-pyrrolidone and combinations of two or more thereof. These comonomers are believed to be commercially available.

Suitable crosslinking agents can include but are not limited to the group consisting of N,N-diallylmethacrylamide, diallylamine, N,N-bisacrylamidoacetic acid, N,N'-bisacrylamidoacetic acid methylester, N,N'-methylenebisacrylamide (methylene-bis-acrylamide), N,N-benzylidenebisacrylamide, allylacrylate, diisopropenylbenzene, diallyl succinate, ethylene glycol diacrylate, diallylacrylamide, divinylbenzene, dinvinyldioxymethylene acetic acid, alkali salts of divinyldioxymethylene acetic acid, and combinations of two or more thereof. All these suitable crosslinking agents are commercially available. The presently preferred crosslinking agent is N,N'-methylenebisacrylamide.

The polymers of the present invention are generally prepared by mixing the ion pair and various monomers in desired molar ratios in aqueous solution and then initiating the free-radical copolymerization. The copolymerization of a ampholytic ion pair with an olefinic comonomer and a crosslinking agent can be achieved by any of the well known free-radical polymerization techniques in solution, suspension, or emulsion environment. Well known azo compounds commonly employed to initiate free radical polymerization reactions include 2,2'-azobis(N,N'-dimethylisobutyramidine) dihydrochloride, azobisisobutyronitrile, 4,4'-azobis(4-cyanovaleric acid), 2,2'-azobis(2,4-dimethyl(4-methoxyvaleronitrile), 2,2'-azobis(2,4-dimethylvaleronitrile), 2,2'-azobis(2-amidinopropane)-dihydrochloride, 2-t-butylazo-2-cyano-4-methoxy-4-methylpentane, and 2-t-butylazo-2-cyano-4-methylpentane, and 4-t-butylazo-4-cyanovaleric acid. Well known inorganic peroxide compounds commonly employed to initiate free radical polymerization reactions include hydrogen peroxide, alkali metal persulfates, alkali metal perborates, alkali metal perphosphates, and alkali metal percarbonates. Well known organic peroxide compounds commonly employed to initiate free radical polymerization reactions include lauryl peroxide, 2,5-dimethyl-2,5-bis(2-ethylhexanoylperoxy)hexane, t-butylperoxyprivilate, t-butylperoctoate, p-methane hydroperoxide, and benzoylperoxide. The compound t-butylhyponitrite is a well known alkyl hyponitrite commonly employed to initiate free radical polymerization reactions. Furthermore, ultraviolet light is commonly employed to initiate free radical polymerization reactions. In addition, such other methods of copolymerization as would have occurred to one skilled in the art may be employed, and the present invention is not limited to the particular method of preparing the polymer set out herein.

The inventive polymers of the present invention containing an olefinic comonomer with amide, nitrile, carboxylic acid, or sulfonic acid functionalities or crosslinking agent with amide, nitrile, carboxylic acid, or sulfonic acid functionalities can optionally be at least partially hydrolyzed and/or neutralized by heating with aqueous base such as aqueous sodium hydroxide or aqueous potassium hydroxide. The degree of hydrolysis and/or neutralization can be controlled by stoichiometrically limiting the amount of base relative to the amount of amide, nitrile, carboxylic acid, and sulfonic acid functionalities. If the hydrolysis is carried out under acidic conditions, the amide and nitrile functionalities can be converted to carboxylic acid functionalities without neutralizing the carboxylic acid or sulfonic acid functionalities of the polymer.

The polymers of the present invention can also optionally be saponified. The term "saponified" used herein, unless otherwise indicated, is the same as at least partially hydrolyzed and/or neutralized of the nitrile or amide functionalities by heating the polymer with an aqueous base. The presently preferred base is selected from the group consisting of lithium hydroxide, sodium hydroxide, potassium hydroxide, ammonium hydroxide, calcium hydroxide, and mixtures thereof. The presently most preferred base is sodium hydroxide. Hydrolysis of these functionalities can be carried out under acidic or basic conditions. Under basic conditions, it generally also includes neutralization of carboxylic acid and sulfonic acid functionalities. The degree of hydrolysis and/or neutralization can be controlled by stoichiometrically limiting the amount of base relative to the amount of amide, nitrile, carboxylic acid, and sulfonic acid functionalities.

The mole percent of the ampholytic ion pair of the present invention ranges from about 1 to about 60, preferably from about 2 to about 50, and most preferably 3 to 30. The mole percent of the comonomers(s) ranges from about 40 to about 99, preferably from about 50 to about 98, and most preferably from 70 to 97. The total mole percent of the ampholytic monomer and the comonomer equals 100 mole percent. The crosslinking agent is provided in an amount effective to produce a highly absorbent copolymer. The mole percent of the crosslinking agent can be from about 0.01 to about 1.0, preferably from about 0.02 to about 0.5, and most preferably from 0.03 to 0.1 based on the total mole percent of the combined monomer and comonomer.

According to the second embodiment of the present invention, a process for absorbing aqueous electrolyte solutions comprises contacting a superabsorbent polymer prepared by copolymerizing: (a) an ampholytic ion pair which is pared from a polymerizable vinylic tertiary amine-containing monomer and and acid having an ethylenic moiety; (b) at least one comonomer selected from the group consisting of acrylamide, methacrylamide, acrylonitrile, acrylic acid, ethacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, 2-methacryloyloxyethyldiethylamine, 3-methacrylamidopropyldimethylamine, styrene sulfonic acid, alkali salts of styrene sulfonic acid, and N-vinyl-2-pyrrolidone and optionally, (c) at least one crosslinking agent which has at least two polymerizable olefinic functionalities wherein the olefin functionalities are suitable for crosslinking; with an aqueous electrolyte solution.

Typical aqueous electrolyte solutions include but are not limited to electrolyte solutions selected from the group consisting of tap water, salt water, brine, and urine. For the purpose of this invention, tap water is defined to have an electrolyte concentration of less than 500 ppm of dissolved electrolytes, urine is defined to have an electrolyte concentration of from greater than 500 ppm to at most 10,000 ppm of dissolved electrolytes, salt water is defined to have an electrolyte concentration from greater than 10,000 ppm to at most 34,000 ppm and brine is defined to have an electrolyte concentration of from greater than 34,000 ppm to the saturation point of the solution.

The scope of the absorbent polymer is the same as that described above for the first embodiment of the invention.

The following examples are provided to illustrate the advantages of the present invention and are not intended to unduly limit the present invention.

EXAMPLE I

This example shows the preparation of an ampholytic ion pair monomer.

An aqueous solution of an ethylenic acid was made in a pre-determined amount of deionized water at 0°–10° C. to yield a 30–40 wt % aqueous solution. The acid solution was then neutralized by adding 75–100 wt % of a vinylic tertiary amine dropwise at 0°–10° C. temperature over the period of 1–2 hours. The neutralization reaction was monitored by a pH meter. Final adjustment of pH to 7 was made at room temperature. The resulting ampholytic ion pair monomer solution was then purified by contacting the ion pair monomer solution with small amount of activated charcoal two or more times. The actual concentration of the ampholytic ion pair monomer in the aqueous solution was determined by evaporatively drying a known amount of the solution and weighing the residue.

EXAMPLE II

This comparative example shows the absorbency of known crosslinked polymers.

The crosslinked polymers were prepared by mixing the monomers in the proportions given in Table I in an aqueous solution of deionized water. The monomers were present in 30–40 weight % relative to the amount of deionized water. The free radical polymerization was initiated with commercially available 2,2'-azobis(N,N'-dimethylisobutyramidine) dihydrochloride. The reaction mixture was then degassed by bubbling nitrogen gas through the mixture for 15 minutes. The amount of the azo free-radical initiator employed was 0.1 mole percent, based on the total moles of the monomers. The reaction temperature was maintained between 20°–35° C. for 24 hours. The reactions produced transparent or cloudy hard gels of the crosslinked polymers. A large volume (1,000 ml for 6 gram gel) of deionized water was added to the polymer product and the polymers were allowed to swell for about 24 hours. The swelled polymers were dried in a forced air convection oven at 74° C. The dried polymers were then mechanically blended into a powder.

Some of the crosslinked polymers were hydrolyzed or neutralized with a strong base such as aqueous sodium hydroxide or aqueous potassium hydroxide. The degree of hydrolysis or neutralization was controlled by stoichiometrically limiting the amount of base relative to the amount of amide, nitrile, or carboxylic acid functionalities. For these examples, a stoichiometric excess of the amount of base was used. A suspension of 1 gram of the polymer in about 20 ml of 0.5 N aqueous sodium hydroxide was heated to 95° C. until a light golden-yellow color was obtained. The mixture was then transferred to a dialysis bag with a molecular weight cut-off of 12,000–14,000 and dialyzed exhaustively against distilled water until the viscous polymer gel had reached pH 7. This viscous polymer gel was then poured into a plastic dish and dried in a forced air convection oven at 74° C. The dried polymers were then mechanically blended to a powder.

The crosslinked polymers were then tested for deionized water absorption and synthetic urine absorption. About 1 liter of deionized water or synthetic urine was added to 0.1 to 0.5 gram of the dried polymer and allowed to stand for 24 hours. The polymer was then separated from the excess unabsorbed liquid by screening through a 100 mesh per inch stainless steel sieve. The absorbency was determined by weighing the isolated polymer containing the absorbed liquid and subtracting the weight of the dry polymer.

The absorbency was measured in units of grams of liquid per grams of polymer. The synthetic urine was prepared by dissolving 0.64 gram $CaCl_2$, 1.14 gram $MgSO_4.7H_2O$, 8.20 gram NaCl, and 20.0 gram urea into 1000 gram deionized water. Several of the polymers were tested two or three times, and the experimental error was within plus or minus 2–5 percent. This small experimental error was largely caused by gel blocking and minor diffusion problems that prevented the aqueous liquid from coming in contact with all the polymer. The results are shown in Table I.

ponified crosslinked acrylonitrile, crosslinked polyacrylic acid, neutralized crosslinked polyacrylic acid, crosslinked polyacrylate, and polymers thereof with sodium 2-acrylamido-2-methylpropane sulfonate. The best of these known polymers absorb up to 65 g of synthetic urine per g of polymer, and most of the known polymers absorb much less than 50 g of synthetic urine per of g of polymer.

EXAMPLE III

The data in Table II demonstrates that although commercially available water absorbing materials are highly absorbent to water, they are also dramatically less absorbent to aqueous electrolyte solutions such as salt water and urine. The commercially available water absorbing materials tested include poly(co-acrylamide-co-acrylic acid) grafted onto starch, a commercial acrylamide polymer sold under the trademark "Water Grabber" ® ("Water Grabber" is a trademark of F. P. Products, Inc.), "LUVS" ® diaper absorbent ("LUVS" is a trademark of Procter & Gamble Co.), "Pampers" ® diaper absorbent ("Pampers" is a trademark of Procter & Gamble Co.), and Favor 960" ® (Stockhausen, Inc.). The best of these known materials absorb up to about 56 grams of urine per gram of absorbing material, and most of the known polymers absorb much less than 40 grams of urine per gram of absorbing material.

TABLE I

Control Data for Known Crosslinked Polymers

| | Mole Percent | | | | | Mole Ratio* | | g/g** | |
|---|---|---|---|---|---|---|---|---|---|
| RUN # | AMPS ® | AM | AN | AA | X-AA | LINK | XOH | DIW | SU |
| 1 | — | 100 | — | — | — | 0.05 | NO | 17 | 15 |
| 2 | — | 100 | — | — | — | 0.05 | YES | 1024 | 25 |
| 3 | — | 100 | — | — | — | 0.05 | YES | 364 | 40 |
| 4 | — | 100 | — | — | — | 0.20 | NO | 13 | 12.5 |
| 5 | — | 100 | — | — | — | 0.20 | YES | 295 | 16 |
| 6 | — | — | 100 | — | — | 0.05 | YES | 608 | 46 |
| 7 | — | — | 100 | — | — | 0.10 | NO | 0 | 0 |
| 8 | — | — | 100 | — | — | 0.10 | YES | 414 | 42 |
| 9 | — | — | 100 | — | — | 0.20 | YES | 352 | 25 |
| 10 | — | — | — | 100 | — | 0.20 | NO | 21 | 11 |
| 11 | — | — | — | 100 | — | 0.20 | Neu+ | 423 | 10 |
| 12 | — | — | — | — | 100(K) | 0.05 | NO | 669 | 57 |
| 13 | — | — | — | — | 100(Na) | 0.05 | NO | 505 | 41 |
| 14 | — | 13 | — | — | 87 | 0.05 | NO | — | 65 |
| 15 | 3 | 13 | — | — | 84 | 0.05 | NO | 350 | 38 |
| 16 | 3 | 20 | — | — | 77 | 0.05 | NO | 417 | 47 |
| 17 | 6 | 13 | — | — | 81 | 0.05 | NO | 738 | 56 |
| 18 | 6 | 26 | — | — | 68 | 0.05 | NO | 533 | 47 |
| 19 | 6 | — | — | — | 94 | 0.05 | NO | 488 | 55 |
| 20 | 10 | 13 | — | — | 77 | 0.05 | NO | 570 | 59 |
| 21 | 20 | 13 | — | — | 67 | 0.05 | NO | 624 | 62 |
| 22 | 100 | — | — | — | — | 0.05 | NO | -Soluble- | |

AMPS ® = 2-acrylamido-2-methylpropane sulfonate (Note: AMPS ® is a trademark of Lubrizol for 2-acrylamido-2-methylpropane sulfonic acid).
AM = Acrylamide
AN = Acrylonitrile
AA = Acrylic Acid
X-AA = Sodium Acrylate or Potassium Acrylate
LINK = Methylene-bis-acrylamide Crosslinking Agent
XOH = Basic Hydrolysis and/or Neutralization with aqueous NaOH or KOH
DIW = Deionized Water
SU = Synthetic Urine
*mole ratio = mole of the crosslinking agent per 100 mole of the ampholytic monomer and the comonomer
**g/g = absorbency units of gram aqueous liquid per gram dried polymer
+Neu = Neutralized The data in Table I demonstrates that although known crosslinked polymers are highly absorbent to deionized water, they are dramatically less absorbent to aqueous electrolyte solutions such as salt water and urine.

Known polymer compositions include crosslinked polyacrylamide, partially saponified crosslinked polyacrylamide, crosslinked polyacrylonitrile, partially sa- The commercially available materials were tested for absorbency to aqueous liquids according to the method employed in Example II.

TABLE II

Control Data for Commercial Materials

| EXP # | commercial Material | DIW | SU |
|---|---|---|---|
| | | g/g* | |
| 1 | Commercial Starch-g-Poly(AM-AA) | 345 | 37 |
| 2 | Water Grabber ® (AM Copolymer) | 440 | 34 |
| 3 | Luvs ® Diaper Absorbent | 191 | 16 |
| 4 | Pampers ® Diaper Absorbent | 171 | 12 |
| 5 | Favor 960 ® | 369 | 56 | g = graft
AM = Acrylamide
AA = Acrylic Acid
DIW = Deionized Water
SU = Synthetic Urine
*g/g = absorbency units of gram aqueous liquid per gram dried polymer

EXAMPLE IV

The homopolymers of the ampholytic ion-pair monomers prepared from 2-methacryloyloxyethyldimethylammonium acrylate (MEDMA-AA), 2-methacryloyloxyethyldimethylammonium methacrylate (MEDMA-MAA), 2-methacryloyloxyethyldimethylammonium 2-acrylamido 2-methylpropanesulfonate (MEDHA-AMPS) or 2-methacryloyloxyethyldimethylammonium 2-methacryloyloxyethane sulfonate (MEDMA-MES) and 0.05 mole % methylene-bis-acrylamide crosslinking agent were tested for their absorbency to deionized water and synthetic urine. The absorbency of homopolymers was very poor as shown in Table III. The absorbency to deionized water was only 8-15 grams of water per gram of polymer and only 10-24 grams of SU per gram of the homopolymers.

TABLE III

Control Data for Ion-Pair Homopolymer

| Mole Percent | | | | Mole Ratio* | g/g** | |
|---|---|---|---|---|---|---|
| MEDMA-AA | MEDMA-MAA | MEDMA-AMPS | MEDMA-MES | Link | DIW | SU |
| 100 | — | — | — | 0.05 | 15 | 20 |
| — | 100 | — | — | 0.05 | 15 | 24 |
| — | — | 100 | — | 0.05 | 8 | 10 |
| — | — | — | 100 | 0.05 | 9 | 20 |

*Mole Ratio = Mole crosslinking agent per 100 mole of the ampholytic ion-pair monomer.
**See corresponding footnote, Table I.

EXAMPLE V

This example illustrates that the inventive polymers prepared from an ampholytic monomer having a polymerizable tertiary amine and a vinylic acid and a comonomer having an ethylenic linkage exhibit much higher absorbency to aqueous solutions.

The polymers were prepared according to the method described in Example II, except that the inventive polymers were prepared by mixing the monomers in the proportions given in Table IV-VII. The inventive polymers were tested for absorbency to deionized water and synthetic urine according to the method described in Example II and the results are shown in Tables IV-VII.

TABLE IV

Experimental Data for Inventive MEDMA/AA Polymers

| Run No. | Mole Percent | | | Mole Ratio* | | g/g** | |
|---|---|---|---|---|---|---|---|
| | MEDMA/AA | AM | X-AA | Link | XOH | DIW | SU |
| 1 | 3 | — | 97 | 0.05 | No | 708 | 84 |
| 2 | 6 | — | 94 | 0.05 | No | 560 | 76 |
| 3 | 10 | — | 90 | 0.05 | No | 584 | 94 |
| 4 | 50 | — | 50 | 0.05 | No | 353 | 38 |
| 5 | 3 | 13 | 84 | 0.05 | No | 746 | 65 |
| 6 | 3 | 13 | 84 | 0.05 | No | 596 | 72 |
| 7 | 3 | 13 | 84 | 0.05 | No | 600 | 67 |
| 8 | 6 | 13 | 81 | 0.05 | No | 782 | 79 |
| 9 | 6 | 13 | 81 | 0.05 | No | 613 | 82 |
| 10 | 3 | 20 | 77 | 0.05 | No | 893 | 71 |
| 11 | 3 | 20 | 77 | 0.05 | No | 770 | 82 |

MEDMA/AA = 2-methacryloyloxyethyldimethylammonium cation/acrylate anion.
AM = Acrylamide.
X-AA = Alkali salt of acrylic acid.
Link = Methylene-bis-acrylamide crosslinking agent.
XOH = Basic hydrolysis and/or neutralization with Aqueous NaOH or KOH solution.
DIW = Deionized water.
SU = Synthetic urine.
*Mole Ratio = mole crosslinking agent per 100 mole of ion-pair monomer and the comonomers.
**g/g = Absorbency units of gram aqueous liquid per gram of dried polymer.

TABLE V

Experimental Data for Inventive MEDMA/MAA Polymers

| Run No. | Mole Percent | | | Mole Ratio* | | g/g** | |
|---|---|---|---|---|---|---|---|
| | MEDMA/MAA | AM | X-AA | Link | XOH | DIW | SU |
| 12 | 3 | — | 97 | 0.05 | No | 600 | 70 |
| 13 | 6 | — | 94 | 0.05 | No | 610 | 69 |
| 14 | 15 | 0 | 85 | 0.05 | No | 547 | 81 |
| 15 | 3 | 13 | 84 | 0.05 | No | 621 | 58 |
| 16 | 6 | 13 | 81 | 0.05 | No | 570 | 67 |
| 17 | 10 | 13 | 77 | 0.05 | No | 596 | 72 |
| 18 | 3 | 20 | 77 | 0.05 | No | 590 | 79 |

MEDMA/MAA = 2-methacryloyloxyethyldimethylammonium cation/methacrylate anion
AM - Acrylamide
X-AA = Alkali salt of acrylic acid
Link = Methylene-bis-acrylamide
XOH = Basic hydrolysis and/or neutralization with NaOH or KOH
*Mole Ratio = Mole of crosslinking agent per 100 mole of ampholytic ion-pair monomer plus comonomer.
**g/g See Table I.

TABLE VI

Experimental Data For Inventive MEDMA/AMPS Polymers

| Mole Percent | | | | | Mole Ratio* | | g/g** | |
|---|---|---|---|---|---|---|---|---|
| MEDMA/AMPS | AM | AN | AMPS | X-AA | LINK | XOH | DIW | SU |
| 5 | 95 | — | — | — | 0.05 | YES | 666 | 100 |
| 10 | 90 | — | — | — | 0.05 | YES | 740 | 112 |
| 15 | 85 | — | — | — | 0.05 | YES | 635 | 76 |
| 20 | 80 | — | — | — | 0.05 | YES | 486 | 80 |
| 5 | — | 95 | — | — | 0.10 | YES | 256 | 51 |
| 10 | — | 90 | — | — | 0.10 | YES | 500 | 97 |
| 15 | — | 85 | — | — | 0.10 | YES | 594 | 108 |

TABLE VI-continued

Experimental Data For Inventive MEDMA/AMPS Polymers

| MEDMA/AMPS | Mole Percent | | | | Mole Ratio* | | g/g** | |
|---|---|---|---|---|---|---|---|---|
| | AM | AN | AMPS | X-AA | LINK | XOH | DIW | SU |
| 20 | — | 80 | — | — | 0.10 | YES | 600 | 92 |
| 6 | — | — | 94 | — | 0.05 | NO | 215 | 60 |
| 10 | — | — | 90 | 00 | 0.05 | NO | 256 | 69 |
| 15 | — | — | 85 | — | 0.05 | NO | 260 | 82 |
| 20 | — | — | 80 | — | 0.05 | NO | 479 | 81 |
| 3 | — | — | — | 97 | 0.05 | NO | 609 | 74 |
| 6 | — | — | — | 94 | 0.05 | NO | 467 | 70 |
| 10 | — | — | — | 90 | 0.05 | NO | 553 | 65 |
| 3 | 13 | — | 84 | — | 0.05 | NO | 527 | 84 |
| 3 | 13 | — | 84 | — | 0.05 | NO | 600 | 83 |
| 6 | 10 | — | 84 | — | 0.05 | NO | 310 | 64 |
| 3 | 20 | — | 77 | — | 0.05 | NO | 600 | 80 |
| 1.5 | 26 | — | — | 72.5 | 0.05 | NO | 922 | 75 |
| 3 | 13 | — | — | 84 | 0.05 | NO | 755 | 80 |
| 3 | 13 | — | — | 84 | 0.05 | NO | 728 | 80 |
| 3 | 20 | — | — | 77 | 0.05 | NO | 836 | 75 |
| 3 | 20 | — | — | 77 | 0.05 | NO | 800 | 77 |
| 3 | 26 | — | — | 71 | 0.05 | NO | — | 80 |
| 3 | 26 | — | — | 71 | 0.05 | NO | — | 80 |
| 6 | 26 | — | — | 68 | 0.05 | NO | 775 | 70 |
| 6 | 26 | — | — | 68 | 0.05 | NO | 752 | 70 |
| 10 | 13 | — | — | 77 | 0.05 | NO | 709 | 60 |
| 10 | 20 | — | — | 70 | 0.05 | NO | 543 | 75 |
| 10 | 20 | — | — | 70 | 0.10 | NO | 500 | 65 |
| 10 | 26 | — | — | 64 | 0.05 | NO | 658 | 60 |

MEDMA/AMPS = 2-methacryloyloxyethyldimethylammonium cation/2-acrylamido-2-methylpropane sulfonate anion
AM = Acrylamide
AN = Acrylonitrile
AMPS = Sodium 2-acrylamido-2-methylpropane sulfonate (AMPS is a trademark of Lubrizol Corporation)
X-AA = Alkali salt of acrylic acid (acrylate)
LINK = Methylene-bis-acrylamide crosslinking agent
XOH = Basic hydrolysis and/or neutralization with aqueous NaOH or KOH
DIW = Deionized water
SU = Synthetic Urine
*Mole Ratio = Mole crosslinking agent per 100 mole of the ampholytic ion-pair monomer and the comonomers.
**g/g = Absorbency units of gram aqueous liquid per gram dried polymer.

TABLE VII

Experimental Data For Inventive MEDMA/MES Polymers

| MEDMA/AMPS | Mole Ratio | | | | Mole Ratio* | | g/g** | |
|---|---|---|---|---|---|---|---|---|
| | AM | AN | AA | X-AA | LINK | XOH | DIW | SU |
| 10 | 90 | — | — | — | 0.05 | YES | 694 | 106 |
| 14 | 86 | — | — | — | 0.05 | YES | 1200 | 105 |
| 15 | 85 | — | — | — | 0.04 | YES | 1300 | 121 |
| 15 | 85 | — | — | — | 0.05 | YES | 1500 | 120 |
| 20 | 80 | — | — | — | 0.04 | YES | 1200 | 85 |
| 23 | 77 | — | — | — | 0.04 | YES | 1008 | 90 |
| 25 | 75 | — | — | — | 0.04 | YES | 1000 | 90 |
| 50 | 50 | — | — | — | 0.05 | YES | 622 | 100 |
| 6 | — | 94 | — | — | 0.05 | YES | 480 | 70 |
| 10 | — | 90 | — | — | 0.05 | YES | 443 | 77 |
| 15 | — | 85 | — | — | 0.05 | YES | 678 | 110 |
| 20 | — | 80 | — | — | 0.05 | YES | 378 | 106 |
| 25 | — | 75 | — | — | 0.05 | YES | 200 | 70 |
| 50 | — | 50 | — | — | 0.05 | YES | 274 | 45 |
| 3 | — | — | — | 97 | 0.05 | NO | 873 | 70 |
| 3 | 13 | — | — | 84 | 0.05 | NO | 616 | 90 |
| 3 | 27 | — | — | 70 | 0.05 | NO | 462 | 85 |
| 3 | 35 | — | — | 62 | 0.05 | NO | 739 | 80 |
| 3 | 47 | — | — | 50 | 0.05 | NO | 694 | 72 |
| 3 | 57 | 00 | 00 | 40 | 0.05 | NO | 609 | 67 |
| 6 | 13 | — | — | 81 | 0.05 | NO | 521 | 83 |
| 10 | 13 | — | — | 77 | 0.05 | NO | 358 | 84 |
| 15 | 13 | — | — | 72 | 0.05 | NO | 528 | 86 |
| 25 | 13 | — | — | 62 | 0.05 | NO | 473 | 74 |

TABLE VII-continued

| Experimental Data For Inventive MEDMA/MES Polymers | | | | | | | | |
|---|---|---|---|---|---|---|---|---|
| | Mole Ratio | | | | Mole Ratio* | | g/g** | |
| MEDMA/AMPS | AM | AN | AA | X-AA | LINK | XOH | DIW | SU |
| 10 | 40 | — | — | 50 | 0.05 | NO | 739 | 80 |

MEDMA/AMPS = 2-methacryloyloxyethyldimethylammonium cation/2-acrylamido-2-methylpropane sulfonate anion
AM = Acrylamide
AN = Acrylonitrile
AA = Acrylic Acid
X-AA = Alkali salt of acrylic acid (acrylate)
LINK = Methylene-bis-acrylamide crosslinking agent
XOH = Basic hydrolysis and/or neutralization with aqueous NaOH or KOH
DIW = Deionized water
SU = Synthetic Urine
*Mole Ratio = Mole crosslinking agent per 100 mole of the ampholytic ion-pair monomer and the comonomers.
**g/g = Absorbency units of gram aqueous liquid per gram dried polymer.

The data in Table IV, V, VI and VII demonstrate that these polymers exhibit significantly improved absorbency to aqueous electrolyte solutions such as urine over the absorbency of the known polymers listed in Table I, the commercially available materials listed in Table II, and the crosslinked ampholytic ion-pair homopolymers listed in Table III.

The absorbency of these polymers to urine is highly unexpected in view of the fact that the homopolymers of ampholytic ion-pair monomers with 0.05 mole percent crosslinking agent only absorb 10–24 gram of synthetic urine per gram of the polymer (Table III). These results demonstrate that the monomers when combined into the polymers of the present invention act synergistically to increase the absorbency of the polymers to aqueous liquids such as salt water and synthetic urine.

Taking an absorbency of about 56 grams of synthetic urine per gram of polymer as about the best of the known polymers, the preferred polymers of the present invention exceed this absorbency to synthetic urine by 20 to 116 percent (67 to 121 grams of synthetic urine absorbed per gram of inventive polymers, Tables IV–VII, compared to 56 grams urine per gram for the best known materials, Tables I and II) without sacrificing absorbency to deionized water. These improved absorbencies translate into large savings in the quantity of polymer required and large savings to the comonomer.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the claims.

That which is claimed is:

1. A composition comprising repeating units derived from: (a) an ampholytic ion pair which is prepared from a polymerizable vinylic tertiary amine-containing monomer selected from the group consisting of N-vinylimidazole, 1-methyl-2-vinylimidazole, 2-vinylimidazole, 4(5)-vinylimidazole, 2-vinylpyridine, 4-vinylpyridine, 2-dimethylaminoethyl methacrylate, 2-diethylaminoethyl methacrylate, 3-methacrylamidopropyldimethylammonium, 2-methacryloyloxyethyldimethyl-ammonium, 3-methacrylamidobutyldimethylammonium, diallyldimethylammonium, 2-vinylquinoline, and mixtures thereof and an acid having an ethylenic moiety wherein said acid is selected from the group consisting of carboxylic acid, phosphoric acid alkali salts thereof, and mixtures thereof; (b) at least one comonomer selected from the group consisting of acrylamide, methacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, 2-methacrylamidopropyltri-methylamine, 3-methacrylamidopropyldimethylamine, 2-methacryloyloxyethyldiethylamine, styrene sulfonic acid, alkali salts of styrene sulfonic acid, and N-vinyl-2-pyrrolidone.

2. A composition according to claim 1 wherein said tertiary amine-containing monomer is 2-methacryloyloxyethyldimethylammonium.

3. A composition according to claim 1 wherein said acid having an ethylenic moiety is an alkali salt of carboxylic acid.

4. A composition according to claim 3 wherein said acid having an ethylenic moiety is an alkali salt of acrylic acid.

5. A composition according to claim 3 wherein said acid having an ethylenic moiety is an alkali salt of methacrylic acid.

6. A composition according to claim 1 wherein said ampholytic ion pair is 2-methacryloyloxyethyldimethylammonium acrylate.

7. A composition according to claim 1 wherein said ampholytic ion pair is 2-methacryloyloxyethyldimethylammonium methacrylate.

8. A composition according to claim 1 wherein said comonomer is an alkali salt of acrylic acid.

9. A composition according to claim 1 wherein said comonomer is an alkali salt of methacrylic acid.

10. A composition according to claim 1 wherein said composition is a copolymer of 2-methacryloyloxyethyldimethylammonium acrylate ion pair and an alkali salt of acrylic acid.

11. A composition according to claim 1 wherein said composition is a terpolymer of 2-methacryloyloxyethyldimethylammonium acrylate ion pair, acrylamide and an alkali salt of acrylic acid.

12. A composition according to claim 1 wherein said composition is a copolymer of 2-methacryloyloxyethyldimethylammonium methacrylate ion pair and an alkali salt of acrylic acid.

13. A composition according to claim 1 wherein said composition is a terpolymer of 2-methacryloyloxyethyl-'dimethylammonium methacrylate ion pair, acrylamide and an alkali salt of acrylic acid.

14. A composition according to claim 1 wherein said ampholytic ion pair is present in said composition ranging from about 1 to about 60 mole % and said comonomer is present in said composition ranging from about 40 to about 99 mole %, based on total mole % of said ion pair and said comonomer equaling 100 mole %.

15. A composition according to claim 14 wherein said ampholytic ion pair is present in said composition ranging from about 2 to about 50 mole % and said comonomer is present in said composition ranging from about 50 to about 98 mole %, based on total mole % of said ion pair and said comonomer equaling 100 mole %.

16. A composition according to claim 15 wherein said ampholytic ion pair is present in said composition ranging from 3 to 30 mole % and said comonomer is present in said composition ranging from 70 to 97 mole %, based on total mole % of said ion pair and said comonomer equaling 100 mole %.

17. A composition according to claim 1 wherein said composition is a copolymer of 2-methacryloyloxyethyldimethylammonium acrylate ion pair and an alkali salt of acrylic acid; wherein said ion pair is present in said composition in the range of from about 1 to about 60 mole %; and said alkali salt of acrylic acid is present in said composition in the range of from about 1 to about 60 mole %.

18. A composition according to claim 1 wherein said composition is a terpolymer of 2-methacryloyloxyethyldimethylammonium acrylate ion pair, acrylamide and an alkali salt of acrylic acid; wherein said ion pair is present in said composition in the range of from about 1 to about 60 mole %; and said alkali salt of acrylic acid is present in said composition in the range of from about 1 to about 60 mole %.

19. A composition according to claim 1 wherein said composition is a copolymer of 2-methacryloyloxyethyldimethylammonium methacrylate ion pair and an alkali salt of methacrylic acid; wherein said ion pair is present in said composition in the range of from about 1 to about 60 mole %; and said alkali salt of methacrylic acid is present in said composition in the range of from about 1 to about 60 mole %.

20. A composition according to claim 1 wherein said composition is a terpolymer of 2-methacryloyloxyethyldimethylammonium methacrylate ion pair, acrylamide and an alkali salt of methacrylic acid; wherein said ion pair is present in said composition in the range of from about 1 to about 60 mole %; and said alkali salt of methacrylic acid is present in said composition in the range of from about 1 to about 60 mole %.

* * * * *